United States Patent [19]

Saitoh

[11] Patent Number: 5,344,618
[45] Date of Patent: Sep. 6, 1994

[54] CRYSTAL REFINING APPARATUS

[76] Inventor: Shigeru Saitoh, 169, Dai, Obamamachi, Iwaki-shi, Fukushima, Japan

[21] Appl. No.: 687,871
[22] PCT Filed: Oct. 4, 1990
[86] PCT No.: PCT/JP90/01283
§ 371 Date: May 30, 1991
§ 102(e) Date: May 30, 1991
[87] PCT Pub. No.: WO91/04777
PCT Pub. Date: Apr. 18, 1991
[51] Int. Cl.$^5$ .................................................. B01D 9/04
[52] U.S. Cl. ................................. 422/254; 422/253
[58] Field of Search .................. 156/DIG. 88, 245; 422/251, 253, 254, 255

[56] References Cited
U.S. PATENT DOCUMENTS

| | | | |
|---|---|---|---|
| 2,731,456 | 1/1956 | Weedman | 422/251 |
| 3,305,320 | 2/1967 | Weech | 422/251 |
| 4,588,562 | 5/1986 | Saitoh et al. | 422/251 |
| 4,623,372 | 11/1986 | Adler et al. | 422/251 |
| 4,632,809 | 12/1986 | Otto et al. | 422/254 |
| 4,806,318 | 2/1989 | Saitoh et al. | 422/251 |

*Primary Examiner*—R. Bruce Breneman
*Assistant Examiner*—Felisa Garrett
*Attorney, Agent, or Firm*—Flynn, Thiel, Boutell & Tanis

[57] ABSTRACT

A crystal refining apparatus having a refining column containing a plurality of vertical shafts having screw blades provided therearound. Each blade rotates in a opposite direction, thereby carrying refined solid crystals upward. The reflux ratio of this apparatus can be much greater than that of the prior art, and highly refined crystals are obtained.

The separated liquid extraction chambers are disposed at the bottom and the side of the refining column and a pressure reduction line is connected thereto so that the separated liquid is extracted at a high rate, accordingly the reflux ratio has become great in value.

4 Claims, 3 Drawing Sheets

CRYSTAL REFINING APPARATUS

BACKGROUND OF THE INVENTION

1. Field of the Invention

This invention relates to an improved crystal refining apparatus.

2. Prior Art

In the crystal refining apparatus of the prior art, for instance, disclosed in the Japanese laid open 87-244402 (Kokai Sho 62-244402), the amount of separated liquid containing impurities extracted from the refining column is dependent on the head difference between the inside and the outside of the refining column, so that the amount of separated liquid by extraction is limited to this extent. Accordingly, the value of the reflux ratio (defined as descending return flow rate inside the refining column /upflow rate of the solid crystal inside the refining column) can not be large enough and, consequently, it is very difficult to obtain highly refined crystal.

An objective of this invention, therefore, is to solve the afore mentioned defects of the conventional crystal refining apparatus and to provide a refining apparatus having a high reflux ratio (defined as descending return flow rate inside the refining column / upflow rate of the solid crystal inside the refining column) and capable of obtaining highly refined crystal.

Another objective of this invention is to provide a crystal refining apparatus which simultaneously can provide washing, sweating and recrystallization when needed, for obtaining highly refined crystals from crude crystals in a short period of time.

Upon further study of the specification and appended claims, further objectives and advantages of this invention will become apparent to those skilled in the art.

SUMMARY OF THE INVENTION

To attain these objectives, there is provided a crystal refining apparatus comprising a refining column including double shafts having screw blades provided therearound with the blades partly overlapping each other, the pitch of said screws are oppositely arranged to each other and they rotate in opposite directions to each other so that they carry solid contents upwardly inside an said refining column. The apparatus further comprises:

a crude material inlet disposed at said refining column;

a refined crystal outlet disposed at upper part of said refining column;

a separated liquid extraction chamber disposed at one side of the refining column where the rotating blades meet together and which receives the separated liquid containing impurities from a solid-liquid separation plate consisting of a plate having a plurality of apertures or a net-like plate through which separated liquid flows down thereto; and/or a separated liquid extraction chamber disposed at the bottom of the refining column and which receives the separated liquid containing impurities from a solid-liquid separation plate consisting of a plate having a plurality of apertures or net-like plate through which separated liquid flows down to said separated liquid extraction chamber; and a pressure reduction line connected to said separated liquid extraction chamber.

DETAILED DESCRIPTION OF THE INVENTION

Figure 1:
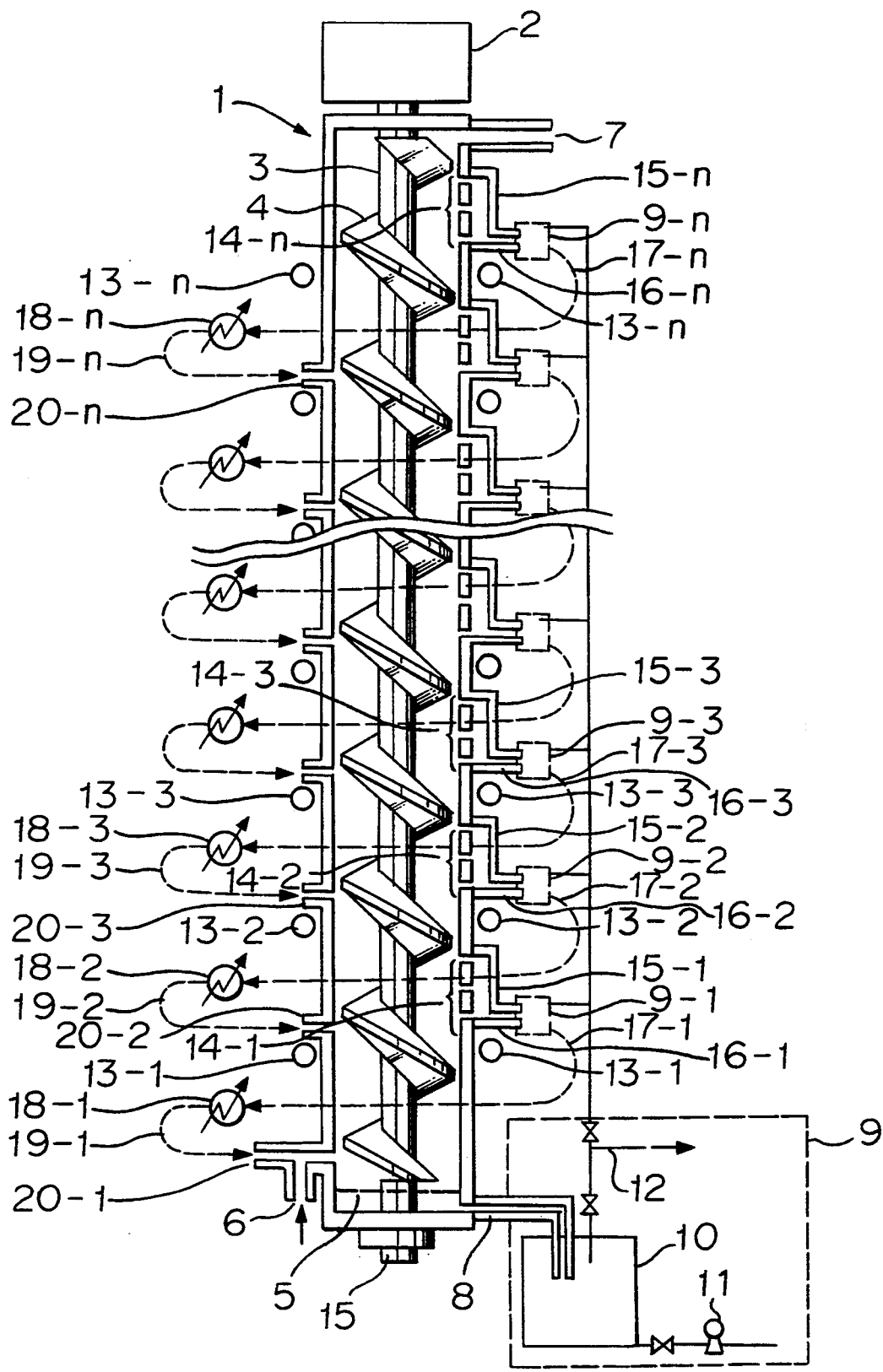
FIG. 1 is an elevation and a schematic section view of the refining apparatus of this invention.
Figure 2:
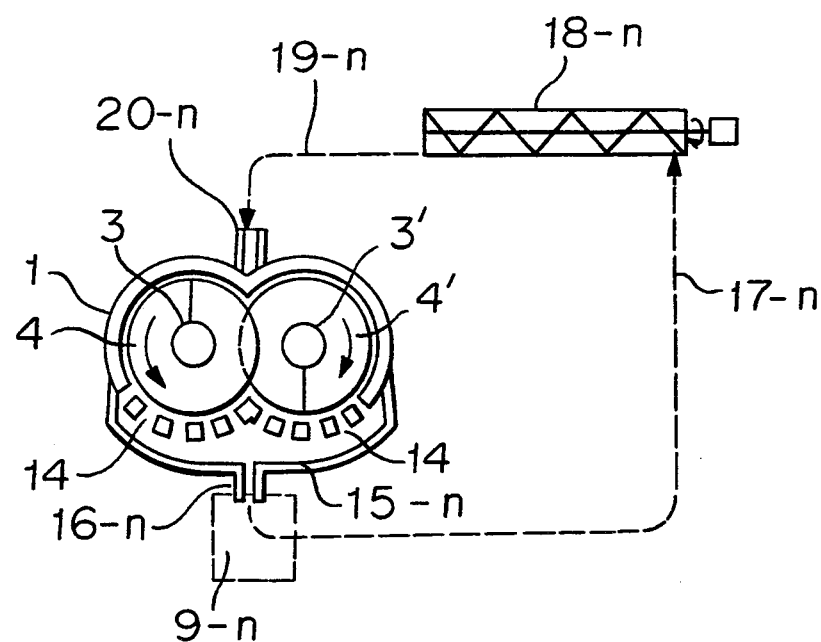
FIG. 2 is an overview and which is a schematic section view of the refining apparatus.

This invention is more specifically explained by the embodiment of this invention shown in the figures attached to the specification.

Referring to FIGS. 1 to 4, it is seen that a refining column 1 of the crystal refining apparatus consists of two vertical cylinders which form, for instance, a cocoon-like shape, and two parallel driving shafts 3,3' disposed inside said cylinders which are driven by a driving unit 2 disposed at the top of said refining column 1. Screw blades 4,4' are disposed around said shafts 3,3' and arranged such that they partly overlap each other and the pitch of each screw blade is made to be opposite to each other. Screw blades 4,4' are rotated by said driving unit 2 in opposite directions to each other and preferably at the same speed to carry solid crystals constantly from the bottom to the top of the refining column 1 where a reformed crystal outlet 7 is disposed.

A crude crystal inlet 6 is disposed at one side of the refining column (left side in FIG. 1) where the screw blades 4,4' move apart and between the primary solid-liquid separation plate 5 and said refined crystal outlet 7.

A primary solid-liquid separation plate 5 consisting of a net-like plate or a plate having a plurality of apertures is located at the bottom part of the refining column 1 and allows separated liquid containing impurities (referred to as separated liquid hereinafter) to flow therethrough and the primary separated liquid extraction chamber 15 is disposed under said solid-liquid separation plate 5.

A separated liquid extractor 8 is connected to said liquid extraction chamber 15 and said separated liquid extractor 8 is connected to a separated liquid extraction system 9.

The separated liquid extraction system 9 comprises a receiving tank 10 which receives the separated liquid containing impurities, a pump 11 and a pressure reduction pipe 12 connected to the said receiving tank to reduce the pressure in separated liquid extraction chamber 15.

Said pressure reduction pipe 12 is connected to a pressure reduction line which enables the lowering of pressure down to about $-760$ mmHg(G), accordingly, it is possible to extract separated liquid from any place of said refining column.

A plurality of secondary solid-liquid separation plates 14-1, 14-2, 14-3, 14-n, consisting of a plate having apertures or a net plate, are disposed at the side of the refining column 1, opposite to said crystal inlet 6 (right side in FIG. 1), where the substantially parallel screw blades approach each other, and located between said solid-liquid separation plate 5 and refined crystal outlet 7. Small secondary chambers 15-1, 15--2, 15-3, 15-n are formed outside said secondary solid-liquid separation plate 14-1, 14-2, 14-3, 14-n. It is desirable to treat the liquid in a thermally insulated condition for preventing deposition of crystals inside said small chambers 15-1, 15-2, 15-3, 15-n, so that heaters and/or coolers can be installed for said small chambers if necessary. Each small chamber 15-1, 15-2, 15-3, 15-n has its own separated liquid outlet 16-1, 16-2, 16-3, 16-n and each separated liquid outlet is connected to its own separated liquid extraction system 9-1, 9-2, 9-31, 9-n.

Figure 4:
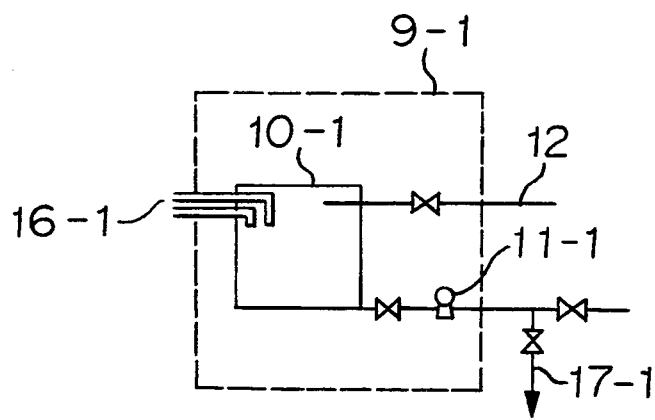
FIG. 4 is schematic view of a separated liquid extraction system.

Each separated liquid extraction system 9-1, 9-2, 9-3, 9-n is, as shown in FIG. 4, constructed the same as said separated liquid extraction system 9 and comprise receiving tanks 10-1, 10-2, 10-3, 10-n, pumps 11-1, 11-2, 11-3, 11-n, and a pressure reduction pipe 12.

Each separated liquid extraction system 9-1, 9-2, 9-3, 9-n and/or separated liquid extraction system 9, is preferably equipped with a heater for preventing the deposition or solidification of said crystals.

Separated liquid containing impurities in each receiving tank 10-1, 10-2, 10-3, 10-n, is withdrawn by each pump 11-1, 11-2, 11-3, 11-n, and may be subjected to a further treatment, for instance, a disposal, or may be returned to said refining column 1 for recycling through schematically conduit 17-1, 17-2, 17-3, 17-n, cooler and/or heater 18-1, 18-2, 18-3, 18-n, conduit 19-1, 19-2, 19-3, 19-n and return inlet 20-1, 20-2, 20-3, 20-n, each of which is disposed at the opposite side of said small chambers 15-1, 15-2, 15-3, 15-n, where each screw blade recedes, and a slightly lower location of said small chamber 15-1, 15-2, 15-3, 15n respectively.

The mixture of the liquid-containing impurities and isolated crystal, which is like sherbet and produced by heating or cooling if necessary, is recycled for continuous refining.

Each small chamber 15-1, 15-2, 15-3, 15-n is also connected to the pressure reduction line and the pressure of each small chamber is reduced simultaneously or independently.

If necessary, coolers and/or heaters 13-1, 13-2, 13-3, 13-n are installed inside or outside said refining column 1 to form a temperature gradient inside said refining column.

In this embodiment, said refining column 1, as shown in FIG. 1, is a vertical one, but it may also be inclined, and formed like a cocoon shape, consisting of two cylinders, but said column may consist of more than three cylinders.

Figure 3:
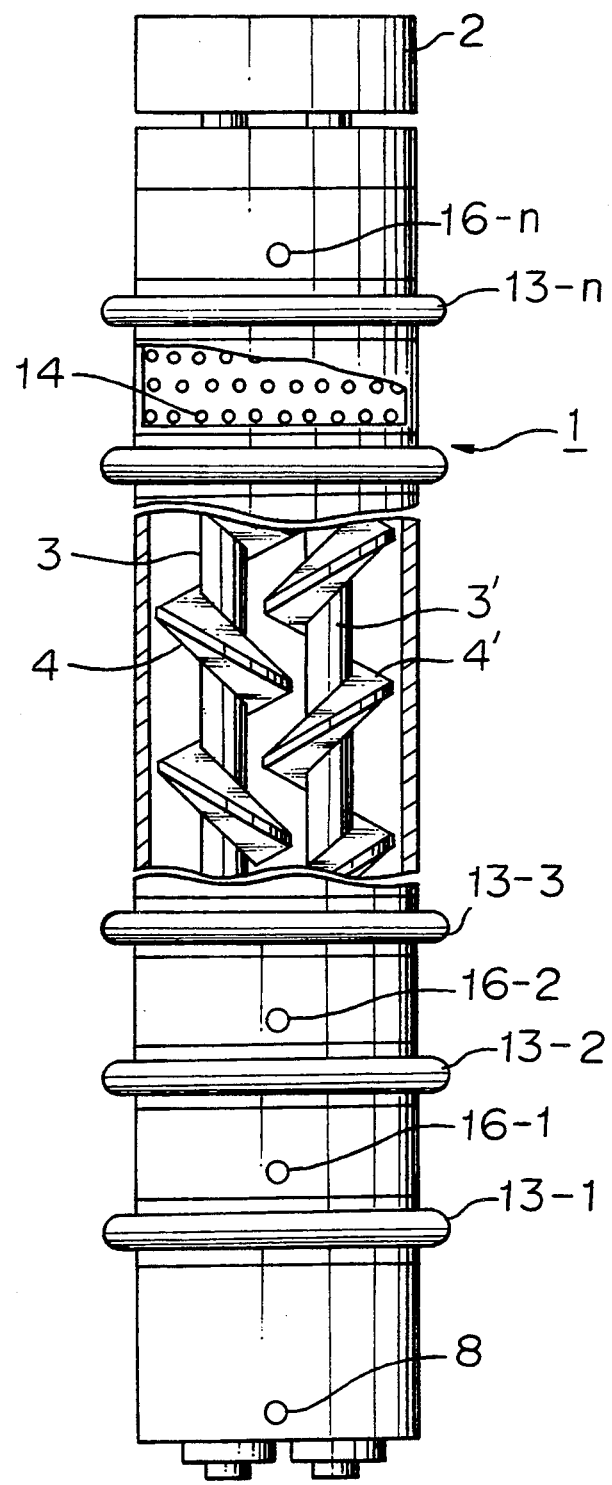
FIG. 3 is a side elevation schematic section view of the refining apparatus.

As to the screw blade, either a continuous screw blade type or a discrete screw blade type is applicable to this invention. In case the refining column is a vertical type as indicated in FIG. 1 or FIG. 3, the position where each blade moves inwardly is indicated at the face side of the drawing sheet in FIG. 3, but it is also permissible that the position where each blade moves inwardly is located at the back side of the drawing sheet. In case the position where each blade moves inwardly is located at the lower part of the drawing sheet, the crude crystal inlet, the small chamber, and the separated liquid extractor or the like may all be disposed at the opposite side of the refining column of that when the position where each blade moves inwardly is located at the face side of the drawing.

As to said heater or cooler, an electric heater, a steam heater or any kind of coolant is applicable to this invention for keeping the temperature gradient of said refining column at a desired gradient depending on the materials subjected to refining.

The heater or cooler may be installed inside the driving shafts and/or inside the screw blades if desired.

As to said solid-liquid separation plate 5 and/or solid-liquid separation plate 14-1, 14-2, 14-3, 14-n, the diameter of the apertures or net void of said solid-liquid separation plate is preferably from 0.05 mm to 5 mm.

FUNCTION OF THE INVENTION

Now function of the construction of this invention is more specifically explained hereinafter.

A crude crystal raw material which is subjected to refining is introduced into said refining column 1 from said crude crystal inlet 6. Said driving unit 2 drives said shafts 3,3' in opposite direction to each other, one in the clockwise direction and the other in the counterclockwise direction as viewed from the top of said refining column, and preferably at the same speed.

Screw blades 4,4' disposed around said shafts 3,3' are arranged partially overlap each other and the pitch of each screw is opposed to the other. Screw blades 4,4' are rotated by said driving unit 2 in opposite directions to cause a pressure gradient between the wall of said refining column and said screw blades which moves inwardly, disintegrates said crude crystal raw material and carries the crystals to the top of said refining column 1 where a refined crystal outlet 7 is disposed.

At the same time, the separated liquid, rich with impurities, flows out through the plurality of solid-liquid separation plates 14-1, 14-2, 14-3, 14-n, which are disposed at the side of said refining column 1, and/or said solid-liquid separation plate 5, which is disposed at the bottom of said refining column 1, into the sectioned small chambers 15-1, 15-2, 15-3, 15-n, and/or separated small chambers 15-1, 15-2, 15-3, 15-n, and/or separated liquid extraction 15 respectively and then into the separated liquid extraction system 9-1, 9-2, 9-3, 9-n and/or the separated liquid extraction system 9.

The impurity-containing separated liquid in the receiving tanks 10-1, 10-2, 10-3, 10-n of the extraction system 9-1, 9-2, 9-3, 9-n respectively and/or in the separated liquid extraction chamber 10 of the separated liquid extraction system 9, is then extracted promptly by the aid of lowered pressure in the receiving tanks 10-1, 10-2, 10-3, 10-n and/or the separated liquid extraction chamber 10 caused by the vacuum pump (not shown) which is connected to the pressure reduction line through reduction pipe 12, as the pressure can be lowered down to about $-760$ mmHg(G) depending on the predetermined condition.

Receiving tanks 10-1, 10-2, 10-3, 10-n and/or the tank 10 can be heated by the heater (not shown) thereby preventing deposition of the crystals and sticking to the wall.

Said extracted separated liquid is subjected to other treatment for instance, disposal, or recycled by pumps 11-1, 11-2, 11-3, 11-n.

To make the temperature gradient according to the desired condition, a heater or a cooler 13-1, 13-2, 13-3, 13-n may be equipped outside or inside of said refining column 1. In some cases, it is possible to install a heater and/or a cooler outside or inside of said purification column 1 to adjust the temperature gradient under more strict conditions. In a certain condition, the temperature at the raw material inlet 6 is kept at the lowest and the temperature at the refined crystal outlet 7 is kept at the highest depending on the materials subjected to refining.

Consequently, the crystals in the crude raw material is continuously recrystallized and refined crystals obtained.

The separated liquid containing impurities extracted from the small chamber 15-1 is then introduced into the heater and/or cooler 18-1, via the outlet 16-1, the receiving tank 10-1, the pump 11-1, and the conduit 17-1, forming crystals in the outflow and come to the mixture of the crystal and liquid containing impurities which is in some case a slurry-like liquid.

Then the mixture is returned to the refining column 1 through a single or more than two return inlets, for instance, a return inlet 20-1 in FIG. 1, which is located below the small chamber 15-1 and near the raw material inlet 6 via conduit 19-1, for further refining.

The impurity-containing separated liquid extracted from the small chamber 15-2, as described above, is also introduced into the heater and/or cooler 18-2, via the outlet 16-2, the receiving tank 10-2, the pump 11-2, and the conduit 17-2, forming crystals in the outflow of separated liquid containing impurities and the outflow is returned to the refining column 1 through the return inlet 20-2 in FIG. 1, via conduit 19-2 for further refining.

As described above from every small chamber 15-3, 15n, separated liquid is taken out and returned to the refining column 1, the refined crystal is taken out from the crystal outlet 7 and the residue liquid, which contains comparatively more impurities, is taken out continuously from the outlet 8.

Therefore, according to this invention, an amount of return liquid flowing up in the refining column, that is, the ratio of the amount of return liquid and amount of solid refined crystal flowing up the refining column, which is referred to as reflux ratio, can be larger than in the crystal refining apparatus of the prior art.

Consequently, inside the refining column 1, the crystal flowing up and moving toward the outlet 7, and the highly refined return molten liquid generated by heating or cooling or introduced from the top of the refining column 1, flowing down inside the refining column, flow in opposite directions to each other, and they contact while flowing so that the surface of said crystal is cleaned by said return liquid, which is referred to as cleaning, impurities included inside the crystal are extracted by the heating or cooling apparatus in a process referred to as sweating, and further, molten crystal is recrystallized while contacting the solid crystal flowing up inside the refining column in a process referred to as recrystallization. These three operations take place simultaneously in the refining column.

According to this invention, the crystal component is carried to said refined crystal outlet 7 while being refined and, at the same time, separated liquid is taken out through the solid-liquid separation plate 14-1, 14-2, 14-3, 14-n and/or 5 into the small chambers 15-1, 15-2, 15-3, 15-n and/or separated liquid extraction chamber 15. Then the separated liquid is taken out from the outlets 16-1, 16-2, 16-3, 16-n and/or 8 and is subjected to disposal, recycling or other treatment via pimp 11-1, 11-2, 11-3, 11-n and/or 11 of the extraction system 9-1, 9-2, 9-3, 9-n and/or 9.

According to this invention, the separated liquid is extracted from the refining column at a comparatively large rate because of the pressure difference generated by the pressure reduction line connected to the small chambers 15-1, 15-2, 15-3, 15-n and or separated liquid extraction chamber 15, to reduce the pressure therein, and the increased pressure caused by the double screw blades rotating in opposite directions between the blades and the separation plate 14-1, 14-2, 14-3, 14-n disposed one side of the refining column.

According to this invention, the ratio of the amount of return liquid and the amount of solid crystal flowing up in the refining column, the reflux ratio, could be larger than 2, more specifically, from 2 to 10, which is considerably larger than the reflux ratios of the crystal refining apparatuses of the prior art, which are merely from 0.7 to 0.8.

It is the advantages of this invention that it has not been known to utilize a pressure reduction system and pressure caused by the double screw blade for obtaining highly refined crystal at a high rate.

EMBODIMENT

Two cylinders having a diameter of 76.2 cm and the height of 3 m respectively comprise a cocoon like refining column for a refining apparatus and a driving shaft is installed inside each cylinder as shown in FIG. 1 to FIG. 4. The diameter of the apertures of a solid-liquid separation plate disposed at the side wall of said refining column is 2 mm.

A crude naphthalene containing 10% of thianaphthene was subjected to refining in the above-described refining apparatus.

The temperature of the supplied crude crystal is kept at 20° C., and then the temperature at the refined crystal outlet 7 is kept at 80° C., and crude naphthalene is supplied at a rate of 300kg/hr.

The pressure of said extraction system is lowered to $-300$ mmHg(G) and the reflux ratio of this embodiment is 3.

Consequently, refined naphthalene having a purity of 99.9% was obtained at a high rate of 250 kg/Hr from said refined crystal outlet 7.

COMPARATIVE EXAMPLE

On the other hand, the same refining apparatus which is same in size as described above but has no side wall solid-liquid separation plate and pressure reduction system and the separated liquid is extracted only from the separation plate disposed at the bottom of the refining column was used for a comparative experiment. The extraction rate is dependent only on the head difference of the material. The yield of the obtained crystal of the same purity as in the example is 80 kg/Hr and the reflux ratio is 0.8.

From the foregoing description, one skilled in the art can easily ascertain the essential characteristics of this invention and, without departing from the spirit and scope thereof, can make various changes and modifications in the invention to adapt it to various usages and conditions.

ADVANTAGES OF THE INVENTION

According to this invention, the extraction rate of separated liquid has become some ten to hundred times as much of that of conventional refining apparatus and high reflux ratio is obtained because the pressure reduction system and/or pressure causing means inside the refining column is adapted to the refining apparatus of this invention.

Consequently, in case the amount of production of the crystal is constant, the refining apparatus of this invention can provide a higher purity crystal than any conventional refining apparatus. On the other hand in case the purity of the products is constant, the refining apparatus of this invention can provide a higher production rate than conventional refining apparatuses which may be a great help to the industry.

Further, the apparatus of the invention is also applicable as a liquid removing apparatus, such as a dehydrater, having high liquid removal rate.

INDUSTRIAL APPLICATION

The crystal refining apparatus of this invention is constructed such that it is possible to use this refining apparatus for purifying for example, para-dichlorobenzene from the chlorination of benzene, purifying naphthalene containing thianaphthene, refining para-xylene containing ethylbenzene and so on.

Refined materials are occasionally washed with a solvent, such as acetone, methanol, propanol, or the like, if desired.

The crystal refining apparatus of this invention is also used as a liquid removing apparatus, such as a dehydrater.

The crystal refining apparatus of this invention is used not only for the refining of organic materials but also for the refining of industrial salt, production of fruit juice by frozen concentration and for the dehydration of sludges.

What we claim is:

1. A crystal refining apparatus comprising:

a refining column having twin parallel shafts disposed thereon, each of said shafts having screw blades disposed therearound, said screw blades on one shaft having a pitch opposite to the screw blades on the other shaft and overlapping each other so that when said parallel shafts are rotated in opposite directions, said screws blades provided therearound approach each other and separate from each other in a fashion that they work in cooperation to lift material contained within said purification column without interfering with the movement of each other;

a crude material inlet provided on a side of said refining column and at a position where said screw blades separate from each other;

a refined crystal outlet provided on an upper portion of said refining column;

a secondary separated liquid extraction chamber provided on a side of said refining column opposite to said crude material inlet and at a position where said screw blades approach each other;

a secondary solid-liquid separation plate provided between the secondary separated liquid extraction chamber and the screw blades for introducing separated liquid having a high impurity content into said secondary separated liquid extraction chamber from said refining column, said secondary solid-liquid separation plate having a plurality of apertures provided therein through which said separated liquid having a high impurity content flows;

a primary separated liquid extraction chamber provided at a bottom portion of said refining column;

a primary solid-liquid separation plate provided above said primary separated liquid extraction chamber for introducing separated liquid having a high impurity content into said primary liquid extraction chamber from said refining column, said primary solid-liquid separation plate having a plurality of apertures provided therein through which said separated liquid having a high impurity content flows; and a pressure reduction line connected to said separated liquid extraction chambers for reducing the pressure therein and aiding in the removal of the separated liquid having a high impurity content therefrom.

2. The crystal refining apparatus of claim 1, wherein said refining column has a plurality of secondary separated liquid extraction chambers.

3. The crystal refining apparatus of claim 1, additionally comprising a heat exchanger in flow communication with said secondary separated liquid extraction chamber.

4. The crystal refining apparatus of claim 1, additionally comprising a receiving tank connected to said pressure reduction line.

* * * * *

UNITED STATES PATENT AND TRADEMARK OFFICE
CERTIFICATE OF CORRECTION

PATENT NO. : 5,344,618
DATED : September 6, 1994
INVENTOR(S) : Shigeru Saitoh It is certified that error appears in the above-identified patent and that said Letters Patent is hereby corrected as shown below:

```
On the title page, Column 1, please add item [30] as follows:
---[30]   Foreign Application Priority Data
Oct. 4, 1989 [JP]        Japan          1-257969---.
```

Signed and Sealed this

Twenty-eight Day of February, 1995

Attest:

BRUCE LEHMAN

*Attesting Officer*      *Commissioner of Patents and Trademarks*